2,963,488
2-ACETO-3,4-FURANDIMETHANOL AND ESTERS

John S. Webb, Warren Township, Somerset County, N.J., assignor to American Cyanamid Company, New York, N.Y., a corporation of Maine No Drawing. Filed July 30, 1953, Ser. No. 371,429

12 Claims. (Cl. 260—347.4)

This invention relates to substituted furans. More particularly, it relates to 2-aceto-3,4-disubstituted furans and methods of preparing the same.

In the past vitamin $B_6$ (2-methyl-3-hydroxy-4,5-pyridine-dimethanol) has been synthesized by the preparation of variously substituted pyridine compounds and the subsequent conversion of said substituent groups to those present in the vitamin by such processes as reduction, nitration, chlorination, diazotization, aminolysis, hydrolysis, etc. Consequently all of these processes require several steps to convert the originally formed substituted pyridine to vitamin $B_6$.

I have now found that 2-aceto-3,4-furandimethanol or an O-acyl derivative or ether thereof can be directly converted into vitamin $B_6$ in a simple operation as described in my copending application, Serial Number 371,430, filed July 30, 1953, now U.S. Patent No. 2,732,379. The subject of the present invention is the preparation of 2-aceto-3,4-furandimethanol and O-acyl derivatives and ethers thereof. These compounds can be prepared by the following reaction:

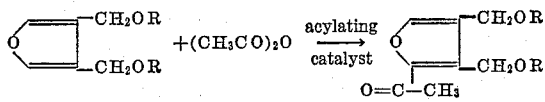

in which R is hydrogen or a radical such as alkyl carbonyl, aryl carbonyl or aralkyl carbonyl and alkyl, aryl or aralkyl radicals.

The compounds of the present invention are white crystalline solids having comparatively low melting points and being relatively insoluble in water.

In preparing the compounds of the present invention we prefer to start with 3,4-furan dicarboxylic acid or an ester or anhydride thereof. This compound is then reduced by the use of lithium aluminum hydride or other methods such as catalytic reduction to produce 3,4-furandimethanol.

The 3,4-furandimethanol can be converted directly to 2-aceto-3,4-bis(acetoxymethyl)furan by the use of acetic anhydride or the 3,4-diacyloxymethyl compounds can be prepared by the use of an acid chloride or anhydride and subsequently converted to the 2-acetyl compound. Similarly the diether can be prepared and once having obtained the 3,4-diacyl compound or ether, the acetyl radical is substituted in the 2-position on treatment with acetic anhydride in the presence of an acylating catalyst.

In carrying out the process of the present invention intermediates such as 3,4-bis(acetoxymethyl)furan; 3,4-bis(propionoxymethyl)furan; 3,4-bis(butyryloxymethyl)-furan; 3,4-bis(formoxymethyl)furan; 3,4-bis(benzoxymethy)furan; 3,4-bis(furoxymethyl)furan; 3,4-bis(phenylacetoxymethyl)furan; 3 - acetoxymethyl - 4 - benzoxymethyl furan; etc. can be used. Also ethers such as 3,4-bis(methoxymethyl)furan; 3,4-bis(ethoxymethyl)furan; 3,4-bis(propoxymethyl)furan; 3,4-bis(phenoxymethyl)-furan; 3,4-bis(benzyloxy)furan; etc. can be used. Mixed acyl derivatives of 3,4-furandimethanol can also be used. However, the 3,4-diacetoxy compound is preferred because of its availability and cheapness. Obviously 3,4-furandimethanol can be used which in the process of the present invention would result in 2-aceto-3,4-bis(acetoxymethyl)furan.

The temperature at which the process of the present invention may be carried out will vary somewhat with the particular intermediates used. In general, the reaction is carried out in the range of —50° C. to 100° C. The time required to complete the reaction will vary from a few minutes up to 24 hours, being dependent upon the temperature and particular intermediate used.

In the process of the present invention it is desirable to have present an acylating catalyst which can be an acid such as phosphoric, hydriodic, p-toluenesulfonic or reagents such as stannic chloride, boron trifluoride etherate, iodine, etc.

The following examples describe the process of the present invention in greater particularity.

Example 1

A solution of 37 g. of dimethyl 3,4-furan dicarboxylate (prepared according to the procedure of Alder and Rickert, Ber. 70, 1354) dissolved in 400 ml. of absolute ether is added dropwise during stirring to 15.2 g. of lithium aluminum hydride in 800 ml. of absolute ether over a period of about one hour. The resulting mixture is stirred two hours at room temperature and then 52 ml. of ethyl acetate is added dropwise during rapid stirring. Following this, 125 ml. of water is added dropwise also during rapid stirring. The ether layer is then decanted from the resulting mass of alumina gel and the latter extraced by stirring several minutes each with two 400 ml. portions of ether. The original ether layer and the two extracts are then combined and dried over anhydrous sodium sulfate. Filtration of the drying agent and removal of the ether by distillation on the steam bath leaves a residue of a pale yellow somewhat viscous syrup. This material is vacuum distilled at a pressure of 1 mm. and the fraction boiling at 115°–120° C. collected to give 18.5 g. of 3,4-furandimethanol, a colorless, water soluble syrup with an index of refraction $n_D^{27}=1.5073$.

3,4-furandimethanol (16 g.), acetic anhydride (50 ml.) and pyridine (0.2 ml.) are heated together on a steam bath for two hours. The resulting mixture is then vacuum distilled at 20 mm. from a steam bath to remove the excess acetic anhydride and the acetic acid formed in the reaction. The residue is then further distilled at a pressure of 0.7 to 0.9 mm. and the material boiling at 104°–106° C. is collected to yield 25.7 g. of 3,4-bis(acetoxymethyl)furan in the form of a colorless oil which has a refractive index of 1.4668 at 26°. On cooling to a low temperature the oil crystallizes to colorless irregular plates which melt at 30°–30.5° C.

3,4-bis(acetoxymethyl)furan, 2.1 g., is dissolved in acetic anhydride, 1.0 ml. To this is added a mixture of 85% phosphoric acid, 0.2 ml., in acetic anhydride, 1.0 ml. The mixture is warmed to 50° C. for a few minutes then sealed from the air and set aside at room temperature overnight. The reaction mixture is then diluted with water, 20 ml., and agitated until the odor of acetic anhydride disappears. The resulting oil is extracted from the aqueous solution with several portions of ether which are combined, washed with a saturated solution of sodium bicarbonate and finally dried with anhydrous sodium sulfate. After filtration from the drying agents the ether is distilled on the steam bath leaving a residue of yellowish oil. This is vacuum distilled at a pressure of 1 mm. and the colorless oil which boils in the range of 130°–150° C. is collected. Most of this oil boils in the range of 145°–148° C. at 1 mm. pressure. On cooling and scratching the oil crystallizes. The product is recrystallized from a mixture of ethyl ether-petroleum ether to give pure 2-aceto-3,4-bis(acetoxymethyl)furan in the form of large, irregular white crystals having a melting point of 51°–52° C. It gives a positive iodoform test and forms a p-nitrophenylhydrazone derivative which has a melting point of 208°–210° C.

Example 2

3,4-furandimethanol, 1.9 g., is dissolved in 20 ml. of dry pyridine and benzoyl chloride, 5 ml., is added dropwise to the solution. The resulting mixture is then warmed on the steam bath a few minutes and diluted with 100 ml. of water. The solid which forms is filtered off and washed with dilute sodium carbonate solution. This crude product is crystallized from dilute alcohol to give 2.3 g. of 3,4-bis(benzoxymethyl)furan in the form of long, fine silky filaments having a melting point of 94°–96° C.

To 4.6 ml. of acylating reagent prepared by adding 5.0 ml. of 85% phosphoric acid to 50 ml. of acetic anhydride is added 2.3 g. of 3,4-bis(benzoxymethyl)furan. The mixture is sealed from the atmosphere and held at 50° C. overnight. The mixture is then poured into 50 ml. of water and allowed to stand until the oil which originally separates hardens to a tan solid. This is then broken up, filtered off, washed well with water and dried to give 2.4 g. of crude 2-aceto-3,4-bis(benzoxymethyl)furan having a melting point of 80°–82° C. This material is recrystallized from alcohol to yield the pure product in the form of short needles having a melting point of 88°–89° C.

Example 3

3,4-furandimethanol, 1.3 g., is dissolved in acetic anhydride, 6.5 ml., and the mixture is cooled to −50° C. One drop of concentrated sulfuric acid is added. The mixture is then allowed to warm up slowly. At −20° C. a reaction sets in and the temperature of the mixture begins to rise rapidly. The mixture is quickly recooled to −50° C. for several minutes then permitted to warm up to 0° for one hour and finally to room temperature. The mixture is poured onto 20 g. of ice and after all of the acetic anhydride has decomposed, is neutralized with solid sodium carbonate. The resulting oily product is isolated by extraction as in the previous example. The residue, after removal of ether, crystallizes on standing to yield 2-aceto-3,4-bis-(acetoxymethyl)furan having a melting point of 50°–51° C. without further purification.

Example 4 p-Nitrobenzoylchloride, 2.0 g., is added to a solution of 3,4-furandimethanol, 0.5 ml., in dry pyridine, 5.0 ml. The mixture is heated 5 minutes on the steam bath, cooled and diluted with 15 ml. of water. A gum forms which crystallizes on stirring. The solid is filtered off, slurried in 15 ml. of 5% sodium carbonate solution, refiltered, washed and dried to give 1.6 g. of crude 3,4-bis(p-nitrobenzoxymethyl)furan having a melting point of 139°–141°. This material is then recrystallized from isopropyl acetate to give the pure compound which has a melting point of 146°–147° C. It can be converted to the 2-acetyl compound by a process similar to those described in preceding examples.

Example 5

2-aceto-3,4-bis-(acetoxymethyl)furan, 30.6 g., is mixed with 240 ml. of N/1 sodium hydroxide and allowed to stand for three days. The resulting clear, dark, neutral solution is saturated with sodium chloride and extracted four times with 100 ml. portions of ethyl acetate. The combined extracts are dried over anhydrous sodium sulfate then filtered and the ethyl acetate removed by distillation under reduced pressure. The residue is then purified by fractional distillation in vacuo to give pure 2-aceto-3,4-furandimethanol, boiling point 161–163/1.5 mm., $n_D^{30}=1.5392$.

I claim:

1. A compound having the general formula:

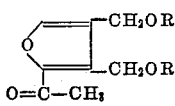

in which R is a member of the group consisting of hydrogen, lower alkyl carbonyl, benzoyl, and nitrobenzoyl radicals.

2. A 2-aceto-3,4-bis(lower alkyl carbonyloxymethyl)-furan.

3. 2-aceto-3,4-furandimethanol.

4. 2-aceto-3,4-bis(acetoxymethyl)furan.

5. 2-aceto-3,4-bis(benzoxymethyl)furan.

6. A method of preparing a 2-aceto-3,4-bis(lower alkyl carbonyloxymethyl)furan which comprises treating 3,4-furan dismethanol with a lower alkanoic anhydride and subsequently with acetic anhydride in the presence of an acylating catalyst and recovering said compounds therefrom.

7. A method of preparing 2-aceto-3,4-bis(lower alkyl carbonyloxymethyl)furan which comprises treating a 3,4-bis(lower alkyl carbonyloxymethyl)furan with acetic anhydride in the presence of an acylating catalyst and recovering said compounds therefrom.

8. A method of preparing 2-aceto-3,4-furandimethanol which comprises treating 3,4-furandimethanol with acetic anhydride in the presence of an acylating catalyst and subsequently with an alkali metal hydroxide and recovering said compound therefrom.

9. A method of preparing 2-aceto-3,4-bis(acetoxymethyl)furan which comprises treating a 3,4-bis(acetoxymethyl)furan with acetic anhydride in the presence of an acylating catalyst and recovering said compound therefrom.

10. A method of preparing 2-aceto-3,4-bis(acetoxymethyl)furan which comprises treating 3,4-furandimethanol with an excess of acetic anhydride in the presence of an acylating catalyst and recovering said compound therefrom.

11. A method of preparing 2-aceto-3,4-bis(benzoxymethyl)furan which comprises treating a 3,4-bis(benzoxymethyl)furan with an excess of acetic anhydride in the presence of an acylating catalyst and recovering said compound therefrom.

12. A method of preparing compounds having the general formula:

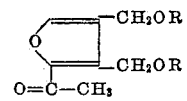

in which R is a member of the group consisting of hydrogen, lower alkyl carbonyl, benzoyl, and nitrobenzoyl radicals, which comprises treating a compound having the formula:

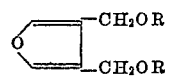

in which R is as defined above, with acetic anhydride in the presence of an acylating catalyst and removing said compounds therefrom.

References Cited in the file of this patent

UNITED STATES PATENTS

| 2,406,657 | Bitler et al. | Aug. 27, 1946 |
| 2,460,823 | Hartough et al. | Feb. 8, 1949 |
| 2,732,379 | Webb | Jan. 24, 1956 |

OTHER REFERENCES

Blanksma: Rec. Trav. Chem., vol. 29, pp. 403–406 (1910).

Middendorp: Rec. Trav. Chem., vol 38, p. 39 (1919).

Newth et al.: Research (London), vol. 3, supplement pp. 50–51 (1950).

Gilman et al.: JACS, vol. 57, p. 908 (1935).